United States Patent [19]
Hershey et al.

[11] Patent Number: 5,568,507
[45] Date of Patent: *Oct. 22, 1996

[54] GEOMETRIC HARMONIC MODULATION (GHM) - ANALOG IMPLEMENTATION

[75] Inventors: John E. Hershey, Ballston Lake; Gary J. Saulnier, Rexford, both of N.Y.; Amer A. Hassan, Cary, N.C.

[73] Assignee: General Electric Company, Schenectady, N.Y.

[ * ] Notice: The term of this patent shall not extend beyond the expiration date of Pat. No. 5,563,906.

[21] Appl. No.: 407,088

[22] Filed: Mar. 20, 1995

[51] Int. Cl.$^6$ .............................. H04B 1/69; H04B 7/12
[52] U.S. Cl. .................... 375/200; 375/267; 375/299; 455/59
[58] Field of Search .............................. 375/200, 267, 375/299; 455/59, 101

[56] References Cited

U.S. PATENT DOCUMENTS

| | | | |
|---|---|---|---|
| 4,628,517 | 12/1986 | Schwarz et al. | 375/299 |
| 5,034,997 | 7/1991 | Iwasaki | 455/101 |

OTHER PUBLICATIONS

U.S. patent application entitled, "Dynamic Code Division Multiple Access Communication System", (Attorney Docket No. RD–24193) J. E. Hershey, A. A. Hassan, G. J. Saulnier.

U.S. patent application entitled "Method of Geometric Harmonic Modulation (GHM)", (Attorney Docket No. RD–23786), J. E. Hershey, G. J. Saulnier A. A. Hassan.

U.S. patent application entitled "Geometric Harmonic Modulation (GHM)—Digital Implementation", (Attorney Docket No. RD–24194), J. E. Hershey, G. J. Saulnier, A. A. Hassan.

U.S. patent application entitled "Geometric Harmonic Modulation (GHM) for Combined Analog/Digital Transmissions", (Attorney Docket No. RD–24195), J. E. Hershey, G. J. Saulnier, A. A. Hassan.

U.S. patent application entitled "Correction of Multipath Distortion in Wideband Carrier Signals", (Attorney Docket No. RD–24196), J. E. Hershey, G. J. Saulnier.

U.S. patent application entitled "Interlaced Geometric Harmonic Modulation", (Attorney Docket No. RD–24223), J. E. Hershey.

*Primary Examiner*—Stephen Chin
*Assistant Examiner*—Jeffrey W. Gluck
*Attorney, Agent, or Firm*—Lawrence P. Zale; Marvin Snyder

[57] ABSTRACT

The present invention provides a novel Geometric Harmonic Modulation (GHM) system. The GHM system operates in two modes, a preamble mode and a traffic mode. During the preamble mode, n+1 frequencies are each offset by a predetermined phase offset in the transmit unit and passed through a channel to a receive unit. The set of phase offsets is used as the spreading code in the transmit unit, and also acts as an 'address' of receive units to transmit to. The receive unit monitors preamble signals to determine the phase offsets. When it recognizes a set of phase offsets, or 'address', which pertains to itself, the receive unit stores the phase offsets and uses these phase offsets to despread and decode the appended message. After the preamble mode is finished, the GHM modulator enters the traffic mode and requests the message to be transmitted from the message source. A traffic carrier waveform is created by multiplying tones, each having its specific phase offset. An analog or binary message is encoded by modulating the traffic carrier waveform. The receive unit detects a preamble carrier and recovers the particular preamble phase offsets to be used as the despreading 'key'. The receive unit then employs the phase offsets in despreading the received signal to recover the transmitted message.

9 Claims, 7 Drawing Sheets

GEOMETRIC HARMONIC MODULATION (GHM) - ANALOG IMPLEMENTATION

CROSS REFERENCES TO RELATED APPLICATIONS

This application is related to U.S. Patent applications "Method Of Geometric Harmonic Modulation (GHM)" Ser. No. 08/407,560, "Geometric Harmonic Modulation (GHM) For Combined Analog/Digital Transmissions" Ser. No. 08/407,555, "Geometric Harmonic Modulation (GHM) - Digital Implementation" Ser No. 08/407,554 by Hershey, Saulnier, Hassan; "Dynamic Code Division Multiple Access Communication System" Ser. No. 08/407,552 by Hershey, Hassan, Saulnier; "Correction Of Multipath Distortion In Wideband Carrier Signals" Ser. No. 08/407,559 by Hershey, Saulnier; and "Interlaced Geometric Harmonic Modulation" Ser. No. 08/407,551 by John Hershey all filed Mar. 20, 1995 all assigned to the present assignee and hereby incorporated by reference.

BACKGROUND OF THE INVENTION

1. Field of the Invention

This invention relates to electronic signal modulation, and more specifically, to spread spectrum modulation.

2. Description of Related Art

Many systems provide for a plurality of transmitter and receiver pairs, "communicating pairs", to communicate simultaneously with little or no interference between communicating pairs. This may be accomplished by allocating a different communication frequency range to each communicating pair, known as frequency division multiple access (FDMA). There are situations in which it is difficult or impossible to assign each communicating pair a unique frequency. This occurs when there are simply too many communicating pairs close to each other on a designated bandwidth.

Another access method, such as time division multiple access (TDMA), may be employed, wherein each communicating unit is assigned a "time slice" in which to communicate on the same frequency band. This causes the "time slices" to become shorter as the number of communicating pairs increases.

Since both FDMA and TDMA communicate on narrowly defined bands, they are both susceptible to narrowband interference. Another method spreads each message from each communicating pair across the entire usable bandwidth. They are all specially encoded such that they may be separated at the receiver. These are known as code division multiple access (CDMA) spread spectrum techniques.

Spread spectrum techniques are those modulation techniques which require a transmission bandwidth that far exceeds the message information bandwidth. The spread spectrum modulation characteristics should not depend upon the individual message to be transmitted as is the case with some other wideband modulation schemes such as wideband FM. There are many spread spectrum mechanisms. They can be conveniently classified as: (i) direct sequence, (ii) frequency hopping, (iii) time hopping, and (iv) hybrids.

In direct sequence spread spectrum modulation, a wideband carrier signal is combined with the relatively narrowband message to yield an encoded wideband signal. A typical digital implementation would be to create a high speed pseudorandom binary sequence having an equal probability of being a one or zero at any particular time. This high speed binary sequence is added to a binary message sequence. The addition is typically done by exclusive-ORing ("XOR") the two sequences together. The bits of the message sequence are much longer in duration than the bits from the high speed pseudorandom source and thus many pseudorandom bits are used per information bit. The pseudorandom bits are often referred to as "chips" and the relationship between the pseudorandom sequence rate and the message rate is such that an integral number of chips are used per message bit. The code used to "spread" the signal at the transmit unit, is required in "despreading" the signal at the receive unit.

Many types of direct spread spectrum modulation techniques require binary data and require an extra step of digitizing an analog signal desired to be transmitted. After the digitized message is received at a receive unit, a binary message is recovered and an analog signal is reconstructed from the binary signal. This results in several conversions, each conversion possibly losing some information.

There are many uses for direct sequence spread spectrum techniques. One primary use is that of spectrum sharing. It is possible for a number of different communicating pairs to occupy the same bandwidth simultaneously without significant mutual interference. This is usually accomplished in direct sequence spread spectrum systems by assigning each communicating pair a different spectrum spreading code. This was described above as CDMA.

Typically, one problem with direct sequence spread spectrum communications and CDMA is synchronization. In order to function properly, the receiver must generate a copy of the spreading code at the same rate as the transmit unit. The receive unit must also correct relative phase discrepancies between the transmit and receive unit. This requires synchronization to be established and maintained at a tolerance finer than a single chip width. Further, the receiver must know the particular spreading code employed by the transmit unit in order to despread the signal and recover the message.

Currently there is a need for a simplified method of direct spread spectrum modulation of both binary and analog message signals which is not as sensitive as conventional systems to synchronization, and which does not require that the receiver know the spreading code in advance.

SUMMARY OF INVENTION

The present invention performs spread-spectrum modulation/demodulation in a simplified manner requiring less complex and powerful hardware. Phases $\phi_0, \phi_1, \phi_2, \ldots \phi_n$ are used as an 'address' and also as the spreading code. During a preamble mode, a preamble signal is sent comprised of a fundamental frequency, or tone, and n higher frequencies, or tones each having a phase of $\phi_0, \phi_1, \phi_2, \ldots \phi_n$, respectively. A receive unit monitors the preamble signals to determine when a message having the proper 'address' is encountered. The set of phases $\phi_0, \phi_1, \phi_2, \ldots \phi_n$, or 'address', is stored to be employed in the despreading of the signal.

In a "traffic mode", the tones are each offset by the corresponding phase and multiplied by each other to form a traffic carrier waveform $W(\Phi,R;t)$ during spreading in the transmit unit. Traffic carrier waveform $W(\Phi,R;t)$ results in $2^n$ frequencies being the odd geometric harmonic multiples of the fundamental tone. R defines the extent of bandwidth spreading.

A binary message to be transmitted is used to cause a $\pi$ phase shift of all frequencies for a bit period, which inverts the traffic carrier waveform, for a bit value of one; and causes no shift, or inversion, for a bit value of zero.

At the receive unit, the phases are extracted during the preamble mode, and are used to construct a reference signal to be compared with the received signal. The comparison produces either a correlation of approximately 1 or −1, meaning that the signal matches, and is inverted, respectively. This comparison is converted on a bit by bit basis into the transmitted binary message.

In the case of an analog signal m(t) being transmitted, traffic carrier waveform W(Φ,R;t) is frequency or phase modulated. The receiver then produces the same reference carrier waveform and demodulates the analog signal, directly.

In still another embodiment, a sensor detects if the input signal is a binary signal $b^{(k)}$, or an analog signal m(t), then activates a multiplier to invert the traffic carrier signal based upon binary signal $b^{(k)}$, or a analog signal modulator for frequency or phase modulating traffic carrier signal, respectively. This allows both analog and digital messages to be transmitted by the same direct spread spectrum device.

Since the present invention performs direct spread spectrum communication without the use of pseudorandom bits or 'chips', the synchronization is not necessarily as difficult as conventional direct sequence spread spectrum systems. Also, since all tones are multiples of a fundamental tone, having a phase of zero, following the fundamental tone allows for simplified synchronization.

The present invention is particularly applicable to spread spectrum code division multiple access (CDMA) communication. Many communicating pairs may occupy the same bandwidth simultaneously with little interference. On the average, the amount of interference increases smoothly as the number of communicating pairs increases. There is little overhead organization required, as compared with time division multiple access (TDMA), and there is also no need to have the receive unit know the despreading code in advance. There is also flexibility in using the 'address' to apply to multiple receive units, to different message types, or to identify the originating transmit unit.

OBJECTS OF THE INVENTION

An object of the present invention is to provide a method of simplified modulation and demodulation of both binary or analog message signals for communication purposes.

Another object of the present invention is to provide a direct spread spectrum communications system capable of transmitting binary or analog signals.

Another object of the present invention is to provide a method of low power spread spectrum communications.

Another object of the present invention is to provide a code division multiple access system which does not require prior knowledge of the spreading code to recover a transmitted message.

Another object of the present invention is to provide a system for spread spectrum communication which is less sensitive to synchronization errors than conventional systems.

Another object of the present invention is to provide a method of spread spectrum communications which may be employed on less complex equipment as compared with conventional methods.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION OF THE PREFERRED EMBODIMENT

Consider that the system supports a number of simultaneous users. Each user of the system signals one bit per symbol time defined as the reciprocal of the signaling rate R. (If an analog message is sent, R represents the extent of bandwidth spreading.) The signaling waveform is a member of $\{W_n(\Phi,R;t)\}$ where $$W_n(\Phi,R;t) = \sum_{i=0}^{n} \sin(2^i \cdot 2\pi Rt + \phi_i) \qquad (1)$$

where n is the "order" of the function, $\Phi=(\phi_0, \phi_1, \ldots \phi_n)$, and $$\phi_i \in \left\{ 0, -\frac{\pi}{2} \right\}.$$

For finite order, n, the functions and all of their derivatives are continuous in the interval $$\left( 0, \frac{1}{R} \right).$$

Figure 1A:
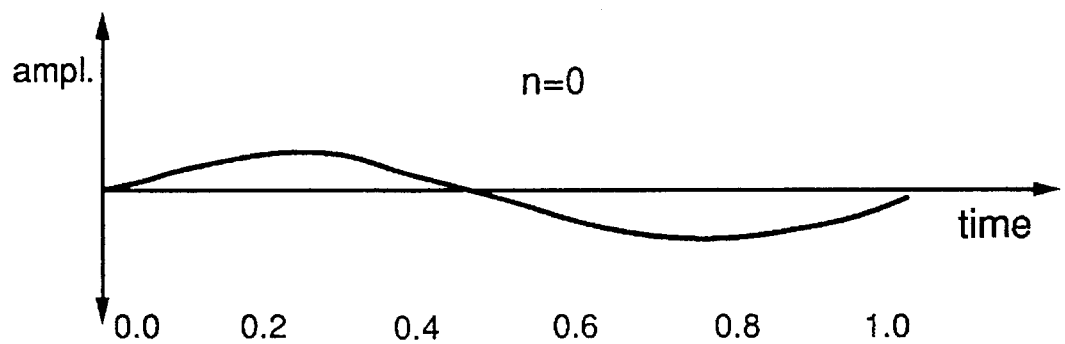
FIGS. 1a, 1b, 1c are graphs of the wave function $W_n(0, 1;t)$ for n=0,3,6, respectively, used in connection with explaining the present invention.
Figure 1B:
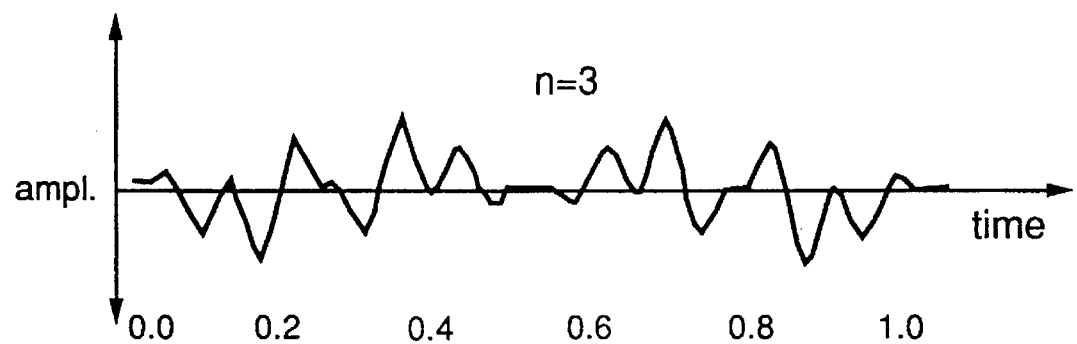
Figure 1C:
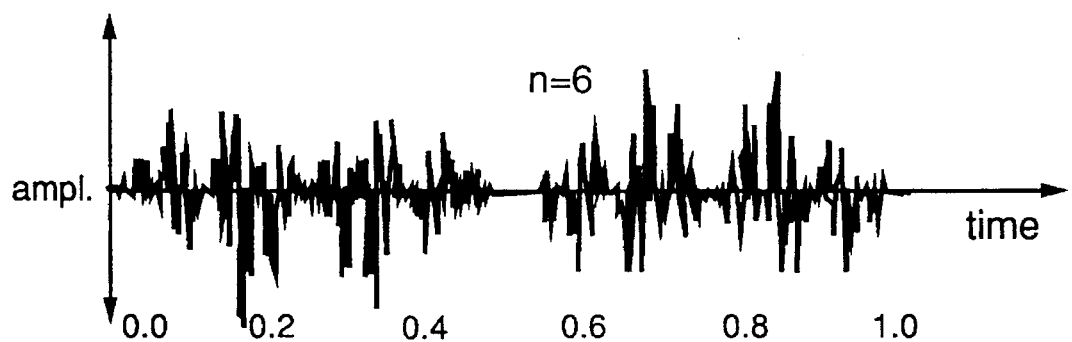

FIGS. 1a, 1b, 1c illustrate representative waveforms of $$2^{\frac{n+1}{2}} W(\Phi,1;t),$$

namely $W_0(0,1;t)$, $W_3(0,1;t)$ and $W_6(0,1;t)$, respectively, where 0 indicates that all of the phases $\phi_i$ are zero. (For these examples, R=1).

If $\{b^{(i)}(m)\}$ is the binary message sent by the i-th user, the i-th user signal can be expressed as $s^{(i)}(t)=b^{(i)}(m)W_n(\Phi, R;\zeta)\delta([\zeta^{(i)}])$ where $\zeta^{(i)}=R(t-\tau^{(i)})-m$, $\tau^{(i)}$ is the time of the start of the i-th transmission, [.] is the greatest integer function, and where $\delta(.)$ is the Kronecker delta function.

The composite signal, $S(t)$, is then:

$$S(t) = \sum_{i=1}^{N} b^{(i)}(m)W_n(\Phi,R;\xi)\delta([\xi^{(i)}]). \quad (2)$$

where N is the number of users. By writing $$\sin(2^i \cdot 2\pi Rt+\phi_i)=1/2j[\exp(j\{2^i \cdot 2\pi Rt+\phi_i\})-\exp(-j\{2^i \cdot 2\pi Rt+\phi_i\})] \quad (3)$$

it is easily seen that Equation (1) can be expanded into a sum as $$W_n(\Phi,R;t) = \quad (4)$$

$$2^{-n} \sum_{k=1,3,5...}^{2^{n+1}-1} \Theta\left(\frac{k-1}{2}\right) \begin{cases} (-1)^{n/2}\sin(k \cdot 2\pi Rt + A \bullet \Phi) \\ \text{for } n, \text{ even} \\ (-1)^{(n-1)/2}\cos(k \cdot 2\pi Rt + A \bullet \Phi) \\ \text{for } n, \text{ odd} \end{cases}$$

where
$A=(\alpha_0, \alpha_1, \ldots, \alpha_n)$ is a binary representation of the summation index k with:

$$\alpha_i = (\pm 1) \text{ and } k = \sum_{i=0}^{n} \alpha_i \cdot 2^i,$$

$$\Phi = (\phi_0, \phi_1, \ldots \phi_n),$$

$$A \quad \Phi = \sum_{i=0}^{n} \alpha_i\phi_i,$$

$\Theta(k)$, $k=0,1,2,\ldots$ is the Thue-Morse sequence. The Thue-Morse sequence can be thought of as the diagonal elements in the infinite Cartesian product $$\lim_{n \to \infty} H_n$$

where $H_n=H_{n-1}\otimes \times H_1$ and $$H_1 = \begin{pmatrix} 1 & 1 \\ 1 & -1 \end{pmatrix}.$$

(The first eight values, $\Theta(0)$–$\Theta(7)$, are (1,–1,–1,1,–1,1,1,–1).

When a message is to be sent, the transmit unit enters the synchronization or preamble mode. For an environment wherein them is negligible multipath, the transmit unit transmits a preamble signal for a series of cycles. A cycle is defined as the duration of time delimited by two successive negative to positive zero crossings of the lowest frequency of the preamble signal.

A frequency of a master sinusoidal signal, or tone is selected. The master tone is divided down to produce frequencies of a plurality of tones, the lowest tone being a fundamental tone. Alternatively, a fundamental sinusoidal signal, or tone, having a fundamental frequency $2\pi f_0$ is selected. A plurality of tones are selected having frequencies which are geometrically progressing multiples of a fundamental frequency, $2\pi f_0$ to result in n+1 tones.

Phases $\Phi=\{\phi_i, i=1, 2, 3 \ldots n\}$ for each of the tones, except for the fundamental tone which has a phase of zero, are selected. The phases $\Phi$ in a preferred embodiment, are either of two substantially separated values, such as 0 and $-\pi/2$ radians, which may be selectable by an operator Phases $\Phi$ are used as the spreading code for spreading an input signal across a frequency spectrum, and for despreading the signal at a receive unit. A preamble carrier waveform is constructed by summing the tones, each incorporating its phase. The preamble carrier waveform has the full transmit power distributed over the n+1 frequencies.

The phases $\Phi$ may also be used as an operator selectable 'address' of an attached message. In one possible embodiment, each receive unit knows its own 'address'. The receive unit constantly monitors preamble signals to identify the phase 'address'. If it encounters an 'address' which matches its own, it then despreads and decodes the appended message using its 'address'.

In an alternative embodiment, the phases $\Phi$ define a transmit unit ID. Each receive unit knows which transmit unit to 'pay attention to' at a given point in time. If the phase 'address' matches a transmitter which the receive unit is supposed to listen to, it despreads and decodes this appended message.

In still another embodiment, the phase 'address' is used to identify message types. Each receive unit knows which message type to monitor in a given situation. For example, a 'broadcast' message type 'address' will be received by all receive units, with a 'group 2' message type being despread and decoded by receive units which are presently designated as 'group 2' receive units, while other receive units presently designated as 'group 1' or 'group 3' will ignore the message.

After completion of the preamble mode, the present invention enters the signaling, or traffic, mode. A traffic carrier waveform is constructed as the product of the tones, incorporating their phases.

Figure 2:
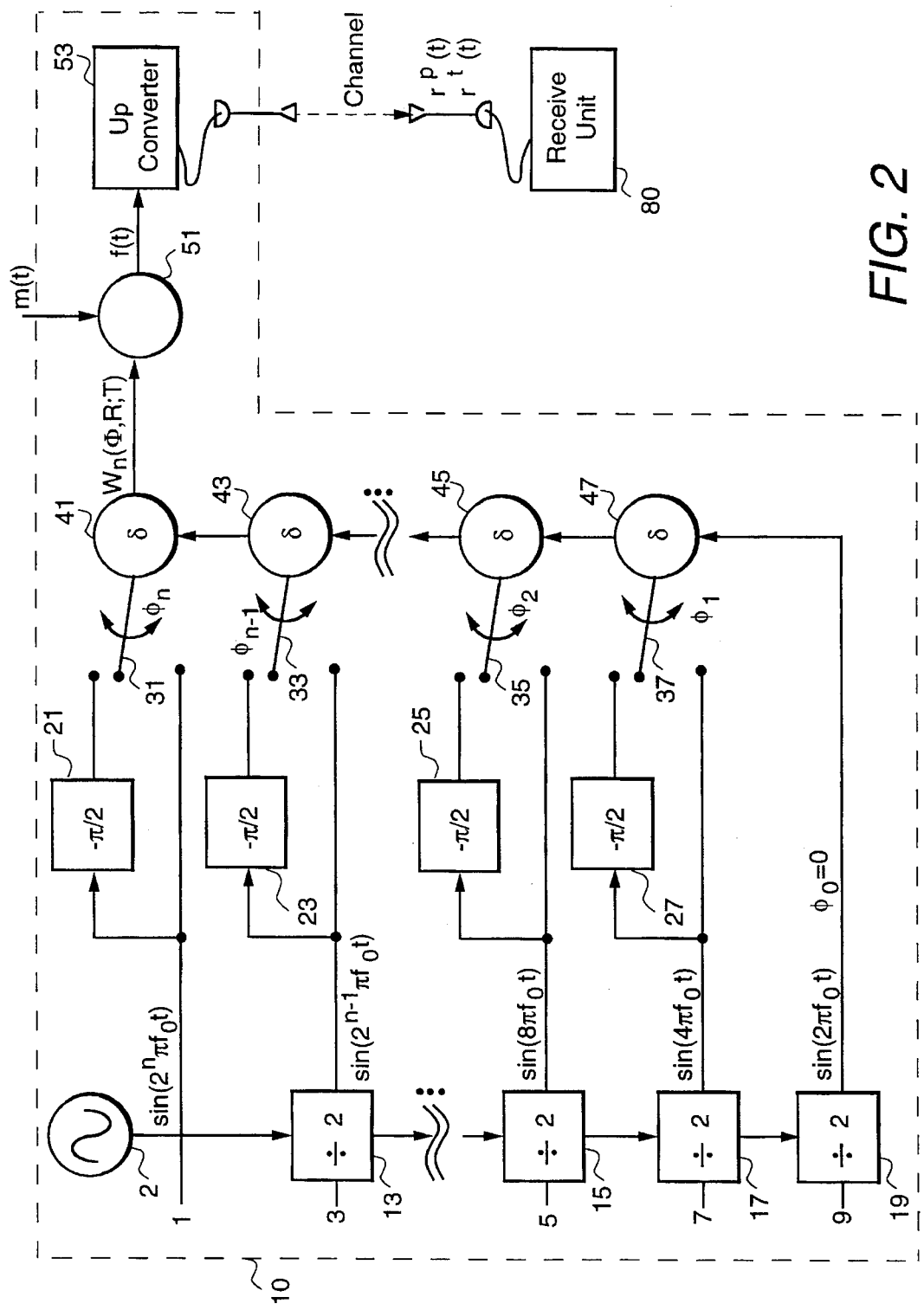
FIG. 2 is a simplified block diagram of a first embodiment of a communications system according to the present invention.

In the example of FIG. 2, an analog circuit of a transmit unit 10 compatible with the present invention is shown.

A reference oscillator 2 of a transmit unit 10 produces a signal, such as a sine wave of a frequency $2^n*2\pi f_0$. This reference sine wave is provided to a plurality of branches 1, 3, 5, 7, 9. Only five branches are shown here, but it is to be understood that will be n+1 branches, with the branch of the lowest frequency component $2\pi f_0$ having a phase $\phi_0$ of 0. Frequency dividers 13, 15, 17, 19 divide the frequency of the sine wave of previous branches in half to result in n+1 sinusoidal signals or 'tones'. Phase devices 21, 23, 25, 27 provide a predetermined phase, here being $-\pi/2$, to selected tones. Branch 9 with the fundamental tone having a frequency $2\pi f_0$, will in the preferred embodiment, always be set to a phase of zero, thereby resulting in only n phases instead of n+1.

Switches 31, 33, 35, 37 are switched to either incorporate the phase of devices 21–27, or not to incorporate these offsets. Switches 31–37 are set to correspond to a predetermined address, or despreading 'key'.

Delta gates 41, 43, 45, 47 act as summers when transmit unit 10 is operating in a preamble mode, and act as multipliers in the traffic mode. The delta gates may be collectively referred to as a combining device. If n is selected to be 5, then 6 tones, each with their own phase $\phi_i$ are transmitted by transmit unit 10 during the preamble mode.

After transmit unit 10 enters the traffic mode, delta units 41–47 act as multipliers creating $2^n=2^5=32$ tones, with each tone having a phase, for n selected to be 5.

A modulator 51 encodes a message signal into the traffic carrier. In the case of a binary message signal $b^{(k)}$ to be transmitted, modulator is a multiplier, and binary message $b^{(k)}$, converted to a series of –1, 1 values, representing the two logical values of a binary signal. Binary message $b^{(k)}$ is fed to the modulator 51 which inverts or does not invert traffic carrier waveform $W_n(\Phi, R;t)$ for a whole bit period, being 1/R. The preamble waveform transmitted during the preamble mode is the sum of tones, each being a geometrically increasing multiple of a fundamental frequency $2\pi f_0$. Whereas the traffic carrier waveform $W_n(\Phi,R;t)$ is the product of these tones, or which result after multiplication by the delta units. This results in the odd harmonics, $6\pi f_0$, $10\pi f_0$, $74\pi f_0$, . . . The fundamental frequency $2\pi f_0$ is also used as the lowest frequency component having a 0 phase.

For transmission of an analog signal a(t), modulator 51 is a frequency, or phase modulator encoding the analog signal a(t) into the traffic carrier waveform $W_n(\Phi,R;t)$.

A complex signal f(t) from modulator 51 is upconverted by an up converter 53 to produce a signal transmitted to a plurality of receive units 80.

Figure 3:
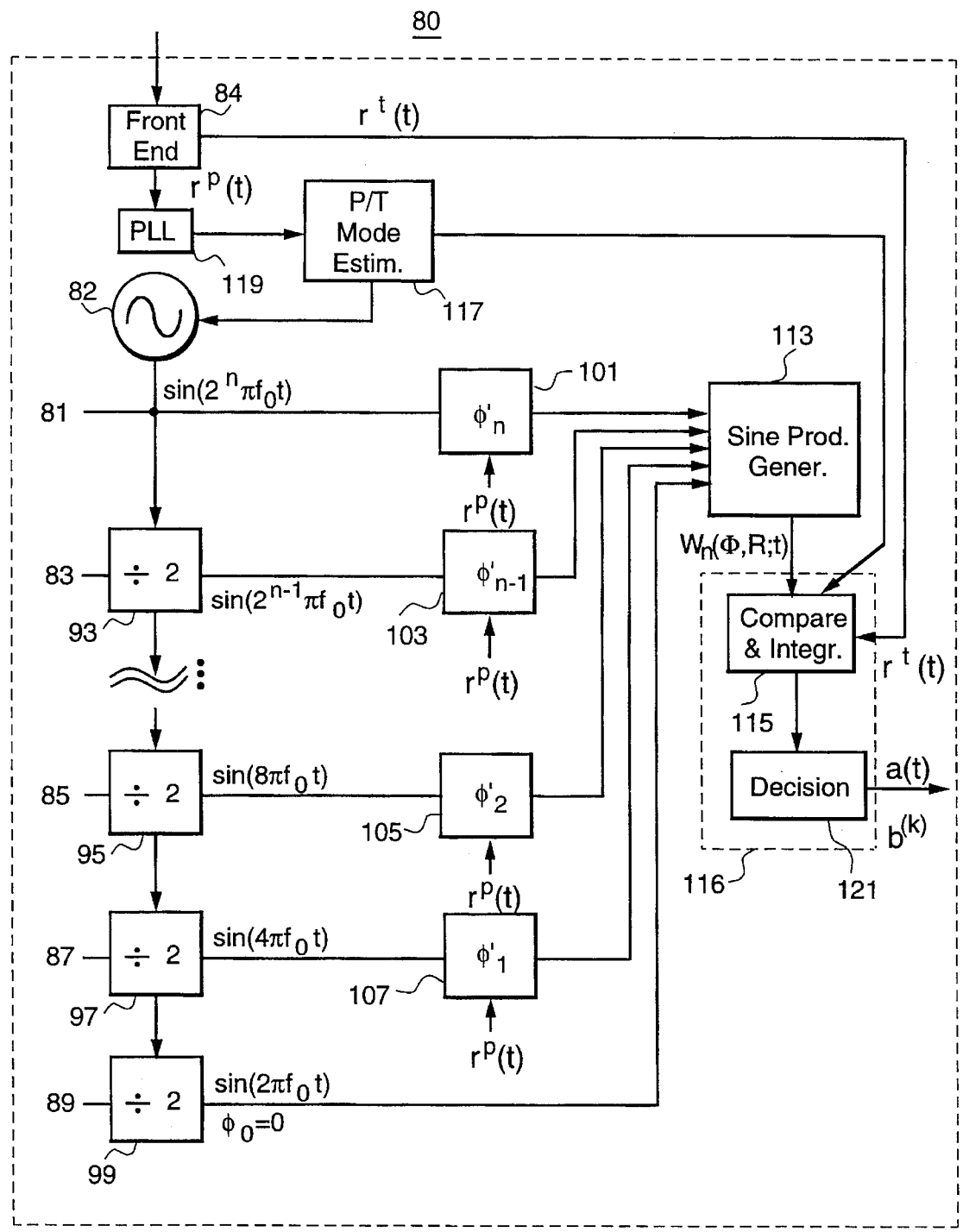
FIG. 3 is a more detailed block diagram of receive unit 80 of FIG. 2.

In FIG. 3, a more detailed block diagram of the receive unit 80 of FIG. 2 is shown. A front end 84 down converts the signal received during the preamble mode $r^p(t)$, and a signal received during a traffic mode, $r^t(t)$. A phase-locked loop (PLL) 119 tracks the fundamental frequency of the received signal and creates a time changing error signal which is used by a preamble/traffic mode estimator (P/T mode estim.) to adjust the phase of a master oscillator 82 in order to minimize the difference in phase. Master oscillator 82 is adjusted throughout the preamble mode. Thus, receive unit 80 establishes a phase reference by which it can estimate the phases of the n other sine waves.

P/T mode estim. 117 monitors even harmonics of the fundamental frequency $2\pi f_0$ for preamble signals and notifies elements of the receive unit 80, such as a compare and integrate unit 115, that it is now in preamble mode. When the preamble mode is over, master oscillator 82 runs without further correction, i.e., it "flywheels" through a traffic mode.

Master oscillator 82 creates a sinusoidal reference signal which is stepped down by frequency dividers 83–89 to create a set of reference tones. Each frequency divider 93, 95, 97 passes its reference tone to phase estimators 103, 105, 107 of branches 83, 85, 87, respectively. Each phase estimator compares its reference tone to a corresponding frequency component of the received signal during preamble mode $r^p(t)$ to estimate a preamble phase $\phi_i$ for this tone. Since the phase of the fundamental tone is set to zero, branch 89 has no phase estimator. Also, branch 81 has a phase estimator which receives its signal directly from reference signal generator 82, and not from a frequency divider.

The set of phases, $\Phi$, denote both an 'address' and determine the spreading code. Once the set of phases is acquired during the preamble mode, they are stored. If the phases $\Phi$ correspond to an 'address' which receive unit 80 is searching for, a message immediately following the preamble signal is despread and decoded using the phases $\Phi$ acquired during the preamble mode.

Once the traffic mode begins, the phases $\Phi$ are employed in the tones of their respective branches, and the tones and offsets are provided to a sine product generator 113. Sine product generator 113 multiplies the tones to create the complex carrier waveform $W_n(\Phi,R;t)$ having the 'address', or spreading code, incorporated into it, which is then provided, along with the signal received during the traffic mode, to a decoding unit, 116.

In the case of a binary message $b^{(k)}$ being decoded, decoding unit 116 has compare and integrate unit 115, and a decision device 121.

Compare and integrate unit 115 correlates the complex carrier waveform $W_n(\Phi,R;t)$ with the received signal $r^t(t)$ and integrates the correlation result over all tones, and over the entire data bit duration.

The output of the compare and integrate is passed to a decision device 121 which compares the result of the integration to a threshold. If the integration result is above the threshold, a logical bit value is output, and if not, a second logical value is output. This results in a logical bit stream $b^{(k)}$.

If receive unit is to decode an analog signal encoded in traffic carrier waveform $W_n(\Phi,R;t)$, decoder 116 may be a conventional frequency demodulator, or a phase demodulator, corresponding to a frequency modulator, or phase modulator used as modulator 51 in transmit unit 10, respectively.

Since all tones employed by the present invention are multiples of a fundamental tone, and the fundamental tone has a phase of zero, synchronization is much simpler than conventional direct spread spectrum systems.

Also, the implementation described above is a very simple circuit, having low power requirements allowing it to be employed in remote areas where spread spectrum technology is required, and where line power is not available and run from a battery.

Figure 4:
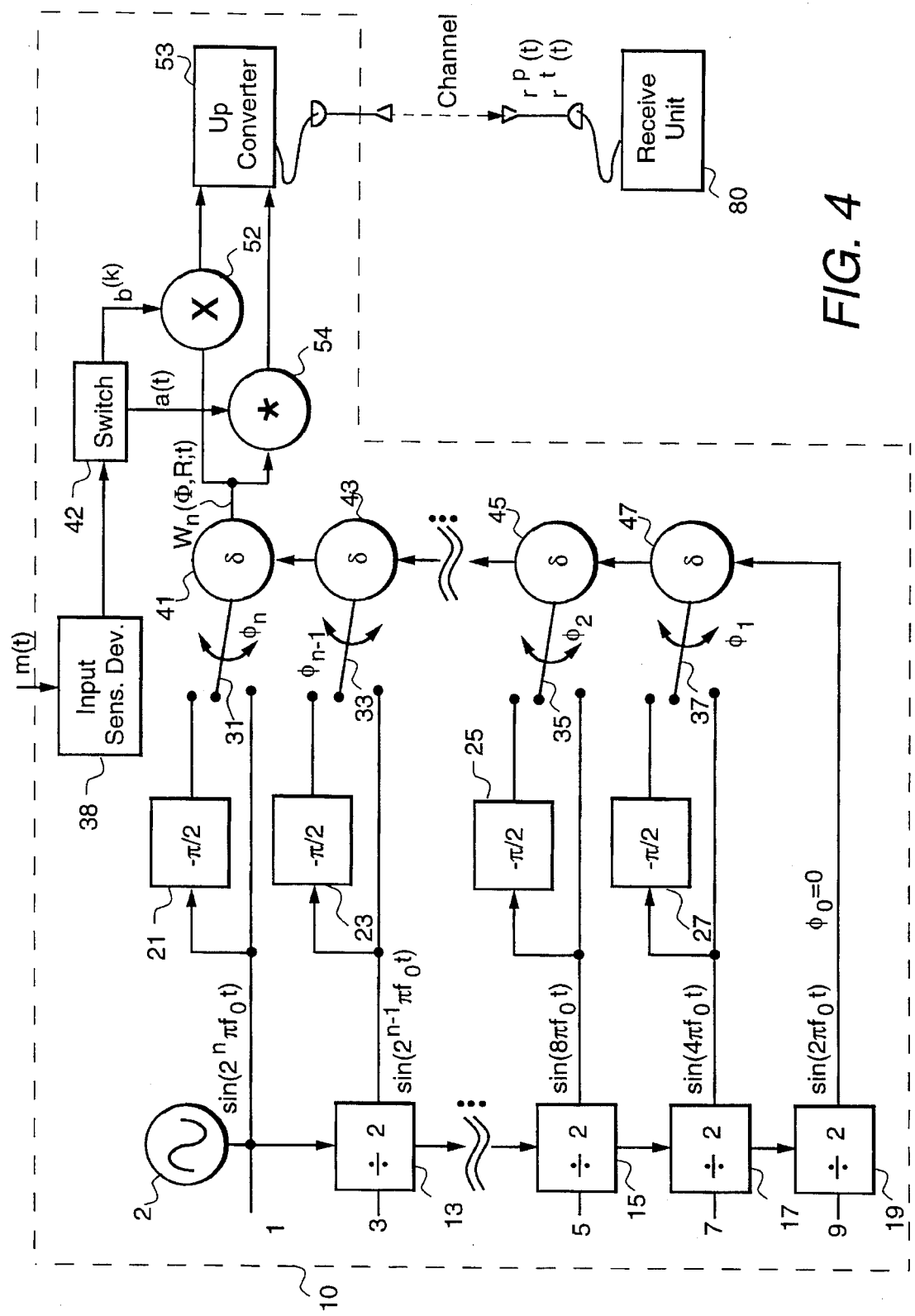
FIG. 4 is a simplified block diagram of a second embodiment of a communications system according to the present invention.
Figure 5:
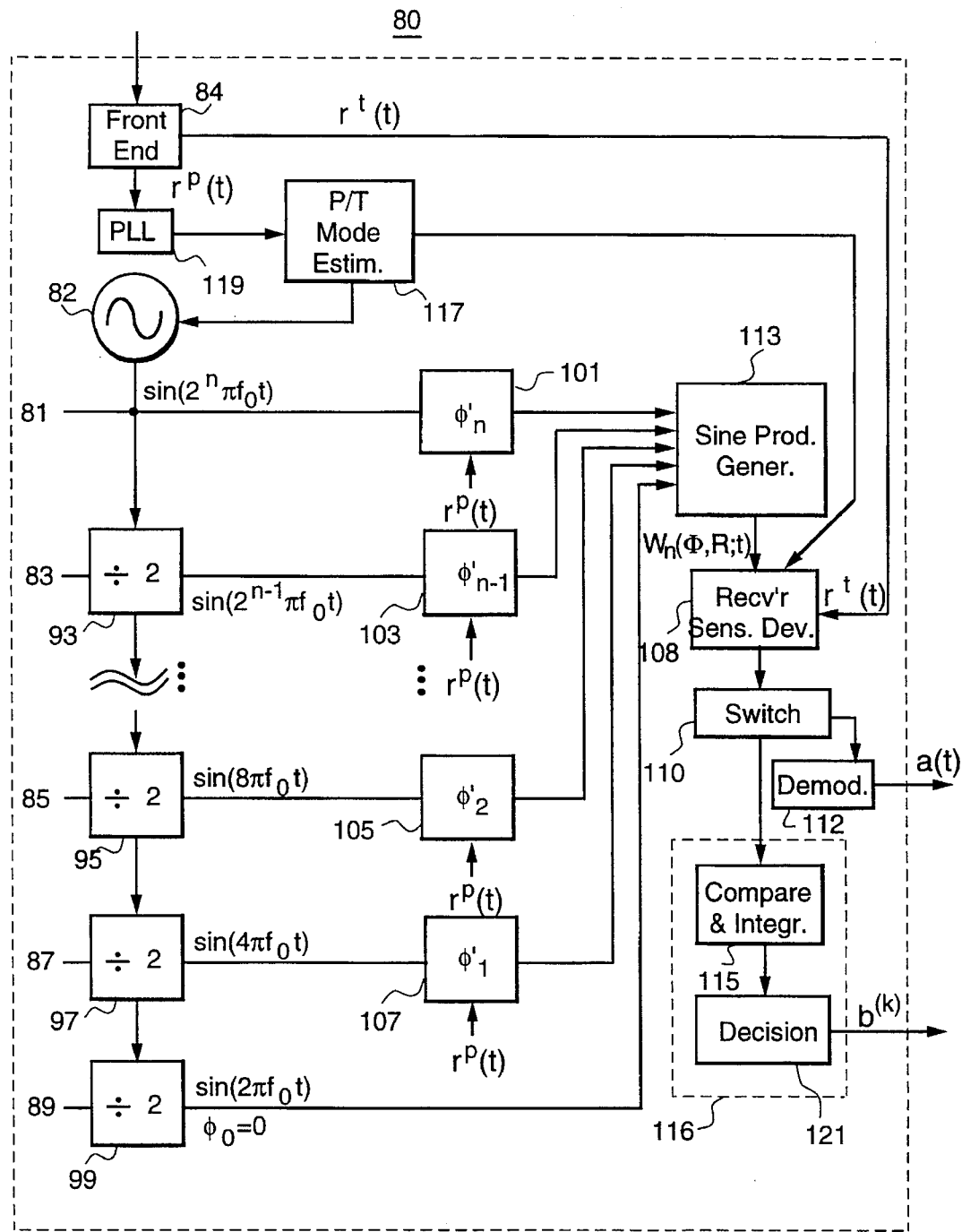
FIG. 5 is a more detailed block diagram of receive unit 80 of FIG. 4.

FIGS. 4, 5 represent another embodiment of the present invention. The same-numbered elements of FIGS. 4, 5 function as their counterparts in FIGS. 2, 3. Modulator 51 has been replaced with a input sensing device 38 a switching unit 42, a multiplier 52 and a modulator 54. Modulator 54 may be a conventional frequency or phase modulator. Input sensing device 38 receives a time changing message m(t) which may be analog, a(t), digital $b^{(k)}$, or both interleaved, and determines if the next message to be transmitted is binary $b^{(k)}$ or analog a(t). If the message is binary, input sensing device activates switching device 42 such that multiplier 52 receives the binary message $b^{(k)}$ and traffic carrier waveform $W_n(\Phi,R;t)$ from delta unit 41 thereby causing it to invert or not invert the carrier waveform based upon binary message $b^{(k)}$.

If input sensing device 38 determines that the next message to be transmitted is an analog signal a(t), it activates switching device 42 to provide analog signal a(t) to modulator 54 to modulate traffic carrier waveform $W_n(\Phi,R;t)$ according to analog message signal a(t).

The advantage of this embodiment of the present invention is to make efficient use of airtime. Binary messages $b^{(k)}$, data, may be transmitted during 'air gaps' in speech or audio transmissions. This may be the majority of the transmission time and result in a great deal of data transfer. The data transfer may be used to transmit images, tables or other information referenced in an audio conversation.

Figure 6:
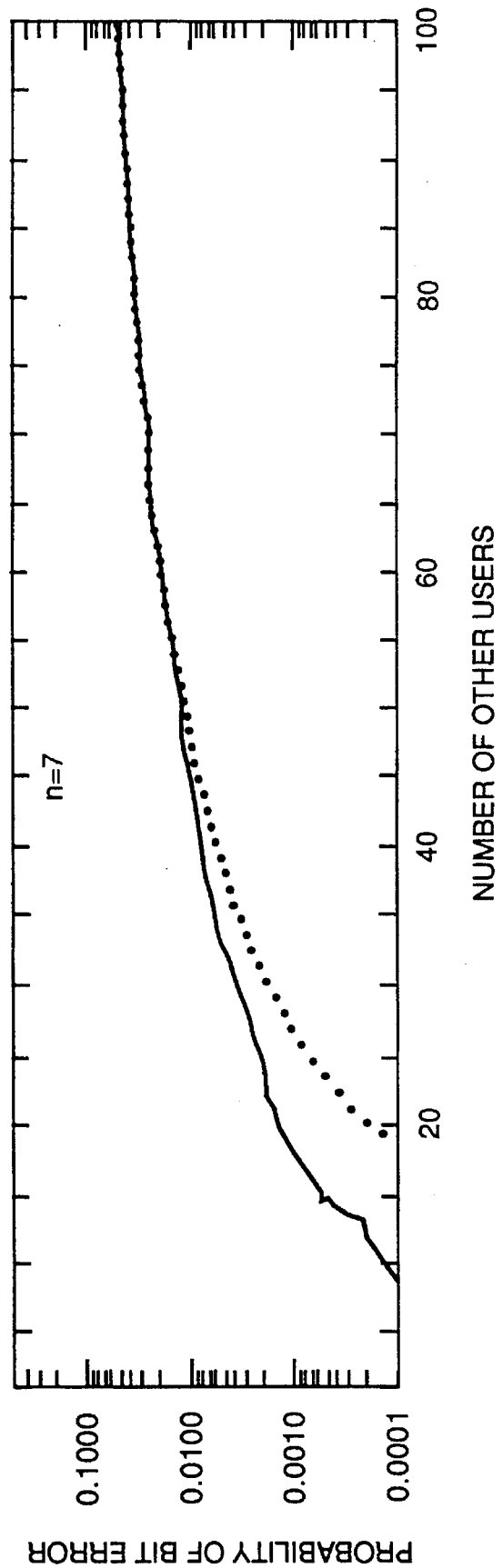
FIG. 6 is an graph of probability of error vs. the number of users of the present invention transmitting a binary signal $b^{(k)}$.

In FIG. 6, the performance of the present invention having a waveform of order n=7 is compared to that of coherent phase shift keying (CPSK). The results of error rate of the present invention using a waveform of order n=7, versus the number of other active users is shown as the solid line plot of FIG. 6. This was achieved with assuming unit energy per bit, $E_b$=1.

The background noise from the m other active users can be modeled as Gaussian, and set:

$$N_O = m \cdot 2^{-n} \tag{5}$$

then, in Gaussian noise, the CPSK probability of error rate $p_e$, may be approximated by:

$$p_e = \frac{1}{2} erfc(\sqrt{E_b/N_0}) \tag{6}$$

where energy/bit $E_b$=1 and $N_0$ is as defined in Eq. (5) above. The plot of CPSK is shown as the dotted line on FIG. 6.

Therefore it can be seen that the error rate of the present invention increases gradually with increased number of users. It can also be seen that the error rate of the present invention with approximately 50 users and n=7 is about the same as the predicted error rate of a conventional CPSK system.

Figure 7:
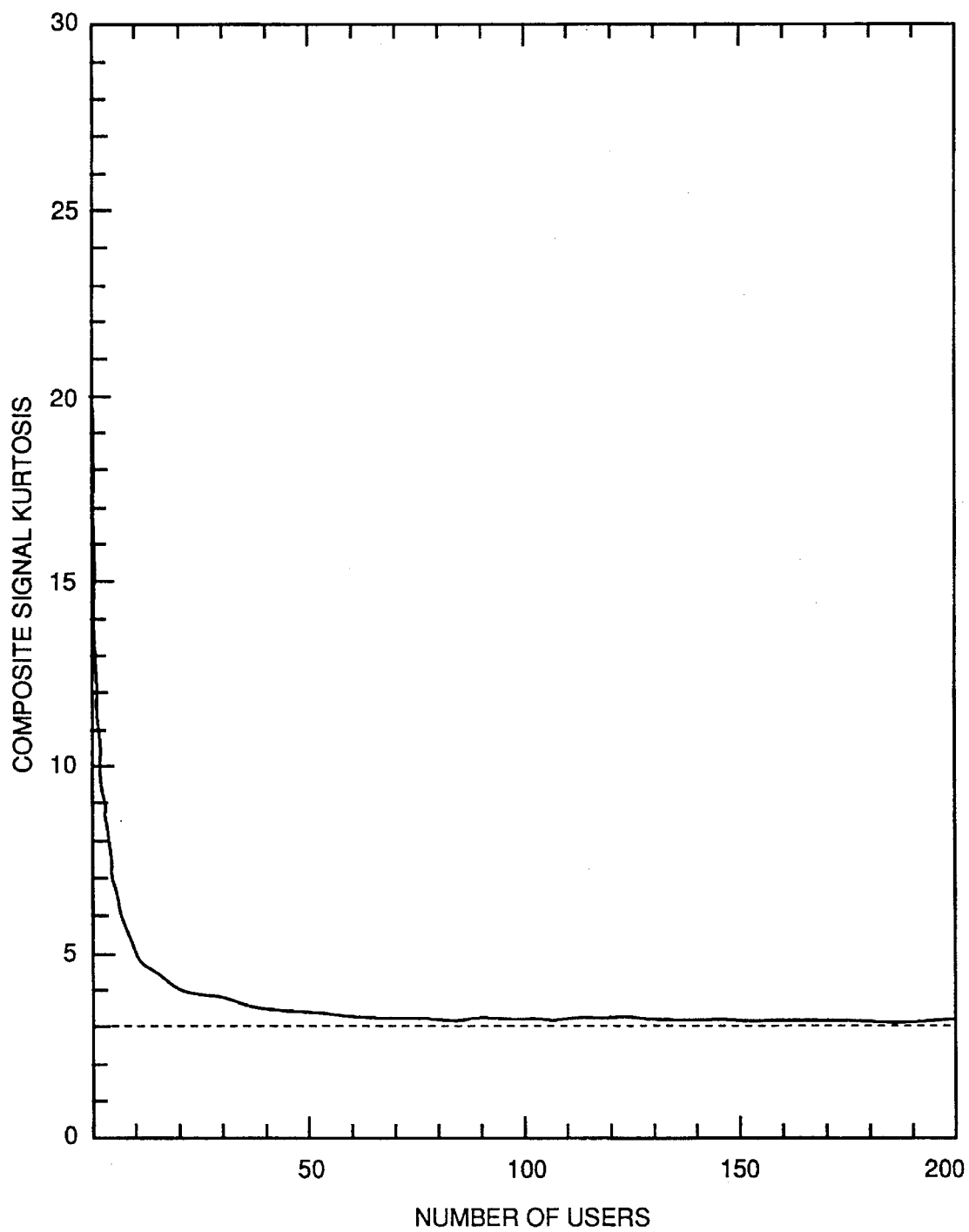
FIG. 7 is a graph of the kurtosis of the power of the composite transmitted signal according to the present invention for 1 to 200 users for n=7.

As can be seen from the example n=6 signaling waveform shown in FIG. 1c, the signal of each individual user of the present invention has, generally speaking, a high dynamic range of the envelope. A composite signal which is the sum of randomly selected signals having randomly selected phases has a much reduced dynamic range of the envelope. A rough simulation was done with n=7 and users picking waveforms randomly. The power of the composite signal, which is what the transmit unit must transmit, was estimated as well as the kurtosis of the signal to see how close it might be to the Gaussian kurtosis of 3. FIG. 7 displays the results for 1 to 200 users.

Note that the composite signal kurtosis becomes very close to that of a Gaussian when the number of users is at least about 50 for n=7.

While several presently preferred embodiments of the novel invention have been described in detail herein, many modifications and variations will now become apparent to those skilled in the art. It is, therefore, to be understood that the appended claims are intended to cover all such modifications and variations as fall within the true spirit of the invention.

What we claim is:

1. A waveform generator for use in a communication device comprising:
   a) a master oscillator for providing a sinusoidal signal of a predetermined frequency;
   b) a first branch for receiving the sinusodial signal from the master oscillator having a phase shifting means for shifting the phase of the received sinusoidal signal by a selected amount to result in an offset tone;
   c) a plurality of successive branches each comprising:
      1. a frequency divider for receiving an adjusted sinusoidal signal from a previous branch, the first of which receives the sinusoidal signal from the master oscillator, and reducing the frequency by a factor of two to result in an adjusted sinusoidal tone at an output,
      2. a phase shifting means coupled to the frequency divider for receiving the adjusted sinusoidal tone for shifting the phase of this tone by a selected amount to result in an offset tone at an output;
   d) a final branch having a frequency divider for receiving the adjusted sinusoidal signal from the last of the plurality of branches and reducing the frequency by a factor of two to result in a fundamental tone with no phase shift at an output;
   e) a combining device coupled to the output of each of the branches, for receiving the offset tones and the fundamental tone, the combining device operating in two modes: a preamble mode and a traffic mode, the combining device summing the received tones to create a preamble waveform when operating in the preamble mode, and the combining device multiplying the received tones to create a traffic waveform $W_n(\Phi,R;t)$ when operating in a traffic mode.

2. A transmit unit for transmitting a binary stream $b^{(k)}$ to a receive unit comprising:
   a) a master oscillator for providing a sinusoidal signal of a predetermined frequency;
   b) a first branch for receiving the sinusoidal signal from the master oscillator having a phase shifting means for shifting the phase of the received sinusoidal signal by a selected amount to result in an offset tone;
   c) a plurality of successive branches each comprising:
      1. a frequency divider for receiving an adjusted sinusoidal signal from a previous branch, the first of which receives the sinusoidal signal from the master oscillator, and reducing the frequency by a factor of two to result in an adjusted sinusoidal tone at an output,
      2. a phase shifting means coupled to the frequency divider for receiving the adjusted sinusoidal tone for shifting the phase of this tone by a selected amount to result in an offset tone at an output;
   d) a final branch having a frequency divider for receiving the adjusted sinusoidal signal from the last of the plurality of branches and reducing the frequency by a factor of two to result in a fundamental tone with no phase shift at an output;
   e) a combining device coupled to the output of each of the branches, for receiving the offset tones and the fundamental tone, the combining device operating in two modes: a preamble mode and a traffic mode, the combining device summing the received tones to create a preamble waveform when operating in the preamble mode, and the combining device multiplying the received tones to create a traffic waveform $W_n(\Phi,R;t)$ when operating in a traffic mode;
   f) a multiplier for multiplying when combining device is operating in traffic mode, traffic waveform $W_n(\Phi,R;t)$ by a −1 to invert traffic waveform $W_n(\Phi,R;t)$ for one logical value, and leave traffic waveform $W_n(\Phi,R;t)$ unchanged for a second logical value to encode binary stream $b^{(k)}$ to result in an encoded traffic waveform; and
   g) up converter for transmitting the preamble waveform, and the encoded traffic waveform, when the combining device is operating in the preamble mode, and traffic mode, respectively.

3. A receive unit for decoding a binary stream $b^{(k)}$ from a preamble waveform and encoded traffic waveform received from a transmit unit comprising:
   a) a master oscillator for providing a reference sinusoidal signal, or tone, of a predetermined frequency;
   b) a first branch for receiving the sinusoidal signal from the master oscillator having a phase estimation means coupled to the master oscillator for receiving the reference tone, receiving said preamble carrier waveform, comparing the reference tone to the preamble carrier waveform to determine a phase of this tone when operating in a preamble mode, the phase estimation means applying this phase to the reference tone to result in an offset reference tone at an output when it is operating in a traffic mode;
   c) a plurality of successive branches each comprising:
      1. a frequency divider for receiving a sinusoidal signal from a previous branch, the first of which receives the sinusoidal signal from the master oscillator, and reducing the frequency by a factor of two to result in an adjusted reference tone,
      2. a phase estimation means coupled to the frequency divider for receiving the adjusted reference tone and receiving said preamble carrier waveform, comparing the adjusted reference tone to the preamble carrier waveform to determine a phase of this tone when operating in a preamble mode, the phase estimation means applying this phase to adjusted reference tone to result in an offset reference tone at an output when operating in a traffic mode;
   d) a final branch having a frequency divider for receiving the adjusted sinusoidal signal from the last of the plurality of branches and reducing the frequency by a factor of two to result in a fundamental tone with no phase shift at an output;
   e) a sine product unit coupled to the output of each of the branches, for receiving the offset tones, multiplying the offset tones to create a reference traffic waveform $W_n(\Phi,R;t)$;

f) compare and integrate unit for receiving reference traffic waveform $W_n(\Phi,R;t)$, and for receiving said encoded traffic waveform, providing a correlation of the two waveforms for a plurality of frequencies and summing the correlation over the plurality of frequencies; and g) a decision device for receiving the correlation sum from the compare and integrate unit and determining a logical value based upon the correlation sum.

4. A transmit unit for transmitting a time-varying analog message signal m(t) to a receive unit comprising:

a) a master oscillator for providing a sinusoidal signal of a predetermined frequency;

b) a first branch for receiving the sinusoidal signal from the master oscillator having a phase shifting means for shifting the phase of the received sinusoidal signal by a selected amount to result in an offset tone;

c) a plurality of successive branches each comprising:
1. a frequency divider for receiving a sinusoidal signal from a previous branch, the first of which receives the sinusoidal signal from the master oscillator, and reducing the frequency by a factor of two to result in an adjusted sinusoidal tone at an output,
2. a phase shifting means coupled to the frequency divider for receiving the adjusted sinusoidal tone for shifting the phase of this tone by a selected amount to result in an offset tone at an output;

d) a final branch having a frequency divider for receiving the adjusted sinusoidal signal from the last of the plurality of branches and reducing the frequency by a factor of two to result in a fundamental tone with no phase shift at an output;

e) a combining device coupled to the output of each of the branches, for receiving the offset tones and the fundamental tone, the combining device operating in two modes: a preamble mode and a traffic mode, the combining device summing the received tones to create a preamble waveform when operating in the preamble mode, and the combining device multiplying the received tones to create a traffic waveform $W_n(\Phi,R;t)$ when operating in a traffic mode;

f) a modulator, for modulating, when combining device is operating in traffic mode, traffic waveform $W_n(\Phi,R;t)$ by said analog message signal m(t) resulting in a modulated traffic waveform; and g) up converter for transmitting the preamble waveform, and the modulated traffic waveform, when the combining device is operating in the preamble mode, and traffic mode, respectively.

5. A receive unit for demodulating an analog message signal m(t) in a modulated traffic waveform from a preamble waveform received from a transmit unit comprising:

a) a master oscillator for providing a reference sinusoidal signal, or tone, of a predetermined frequency;

b) a first branch for receiving the sinusoidal signal from the master oscillator having a phase estimation means coupled to the master oscillator for receiving the reference tone, receiving said preamble carrier waveform, comparing the reference tone to the preamble carrier waveform to determine a phase of this tone when operating in a preamble mode, the phase estimation means applying this phase to the reference tone to result in an offset reference tone at an output when it is operating in a traffic mode;

c) a plurality of successive branches each comprising:
1. a frequency divider for receiving a sinusoidal signal from a previous branch, the first of which receives the sinusoidal signal from the master oscillator, and reducing the frequency by a factor of two to result in an adjusted reference tone,
2. a phase estimation means coupled to the frequency divider for receiving the adjusted reference tone and receiving said preamble carrier waveform, comparing the adjusted reference tone to the preamble carrier waveform to determine a phase of this tone when operating in a preamble mode, the phase estimation means applying this phase to adjusted reference tone to result in an offset reference tone at an output when operating in a traffic mode;

d) a final branch having a frequency divider for receiving the adjusted sinusoidal signal from the last of the plurality of branches and reducing the frequency by a factor of two to result in a fundamental tone with no phase shift at an output;

e) a sine product unit coupled to the output of each of the branches, for receiving the offset tones, multiplying the offset tones to create a reference traffic waveform $W_n(\Phi,R;t)$;

f) demodulator for receiving reference traffic waveform $W_n(\Phi,R;t)$, and the modulated traffic waveform, and demodulating said message signal m(t) from the modulated traffic waveform.

6. The transmit unit of claim 4 wherein the modulator is a frequency modulation unit.

7. The transmit unit of claim 5 wherein the demodulator is a frequency demodulation unit.

8. The transmit unit of claim 4 wherein the modulator is a phase modulation unit.

9. The transmit unit of claim 5 wherein the demodulator is a phase demodulation unit. the phase of the received sinusoidal signal by a selected amount to result in an offset tone;

c) a plurality of successive branches each comprising:
1. a frequency divider for receiving an adjusted sinusoidal signal from a previous branch, the first of which receives the sinusoidal signal from the master oscillator, and reducing the frequency by factor of two to result in an adjusted sinusoidal tone at an output,
2. a phase shifting means coupled to the frequency divider for receiving the adjusted sinusoidal tone for shifting the phase of this tone by a selected amount to result in an offset tone at an output;

d) a final branch having a frequency divider for receiving the adjusted sinusoidal signal from the last of the plurality of branches and reducing the frequency by a factor of two to result in a fundamental tone with no phase shift at an output;

e) a combining device coupled to the output of each of the branches, for receiving the offset tones and the fundamental tone, the combining device operating in two modes: a preamble mode and a traffic mode, the combining device summing the received tones to create a preamble waveform when operating in the preamble mode, and the combining device multiplying the received tones to create a traffic waveform $W_n(\Phi,R;t)$ when operating in a traffic mode.

* * * * *